Patented July 4, 1950

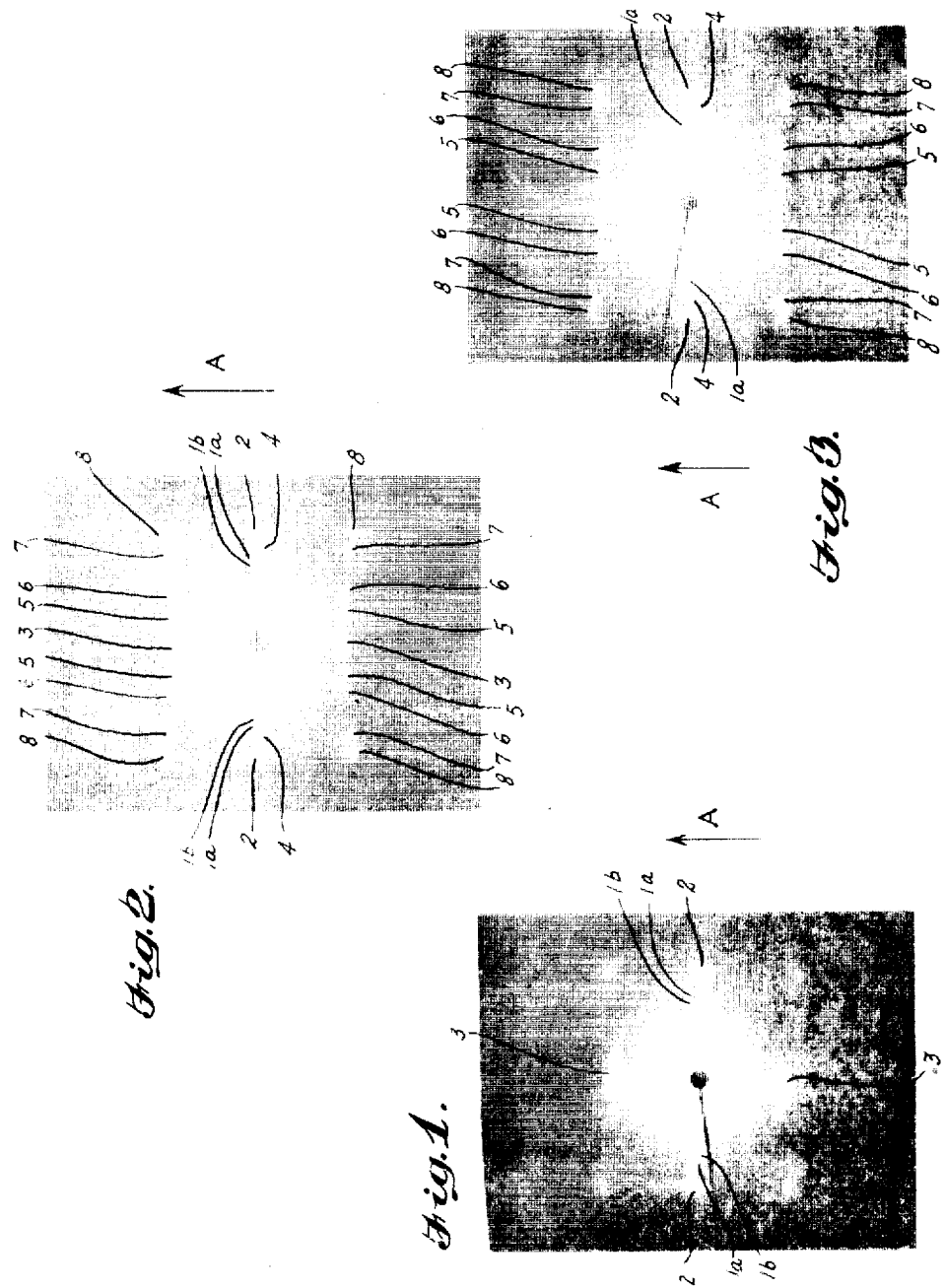

2,514,195

UNITED STATES PATENT OFFICE 2,514,195

ARTICLES COMPOSED OF CRYSTALLINE AND ORIENTED POLYMERS AND COPOLYMERS OF 2,3-DICHLOROBUTADIENE-1,3

Leroy B. Kuhn, Pottstown, Pa., assignor to The Firestone Tire & Rubber Company, Akron, Ohio, a corporation of Ohio Application December 6, 1948, Serial No. 63,776

12 Claims. (Cl. 18—54)

This invention relates to oriented-crystalline resinous polymers and copolymers of 2,3-dichlorobutadiene-1,3 (hereinafter referred to, for brevity, as dichlorobutadiene) and more particularly to oriented-crystalline films, filaments and the like of such polymers and copolymers having a high degree of flexibility toughness and strength. This application is a continuation-in-part of my copending application Serial No. 530,741, filed April 12, 1944, now abandoned.

Dichlorobutadiene may be synthesized from the readily available butadiene, and accordingly is a prospectively attractive starting material for the production of polymeric resins. However, the only resins containing predominantly dichlorobutadiene heretofore prepared have been hard, infusible and insoluble products of no practical worth. The compound has been employed in minor proportions as a monomeric ingredient in experimental synthetic rubbers; however, these latter products have not, so far, met with any technical success.

A very few linear polymeric resins, notably the nylon, polyethylene, and polyvinylidene chloride resins, exhibit the phenomena of crystallization and orientation crystallization. Such resins are fusible and may be molded or extruded to form masses which, if rapidly cooled, are initially amorphous upon solidification. These initially amorphous resins are instantly convertible to an oriented crystalline form by elongating them in one or more directions, which oriented form is characterized by great strength, flexibility, flex resistance, transparency and other desirable properties.

Accordingly, it is an object of this invention to produce useful polymers and copolymers of dichlorobutadiene.

Another object is to produce useful, oriented-crystalline polymers and copolymers of dichlorobutadiene.

Another object is to produce fusible resinous polymers and copolymers of dichlorobutadiene which are convertible to oriented crystalline form.

A further object is to provide novel and useful oriented crystalline resinous polymers and copolymers of dichlorobutadiene characterized by unusually high strength and flexibility.

The invention will be described in connection with the accompanying figures in which:

Fig. 1 is an X-ray diffraction pattern taken from one form of the oriented products of this invention.

Fig. 2 is an X-ray diffraction pattern of a form of the oriented products of this invention intermediate between the form of Fig. 1 and the form of Fig. 3.

Fig. 3 is an X-ray diffraction pattern of another form of the oriented products of this invention.

SYNOPSIS OF THE INVENTION

In accordance with this invention the above and other objects are secured in polymers of dichlorobutadiene, and copolymers thereof with other unsaturated compounds copolymerizable therewith, which polymers and copolymers are prepared by special techniques so as to have an intrinsic viscosity of from 0.1 to 1.5. Such polymers are melted and extruded as rods, filaments, films, etc., solidified by cooling, and elongated to yield products of oriented crystalline character analogous to oriented crystalline products from the nylon and vinylidene chloride resins. The oriented products of this invention are characterized by a high degree of strength, flexibility and toughness, and by resistance to deterioration by heat during processing, which last property greatly facilitates certain thermal and mechanical treatments not commercially feasible with crystalline resins heretofore known.

COMONOMERS EMPLOYED

As noted above, the resins employed in this invention may be either polymers of dichlorobutadiene, or copolymers thereof with such small proportions of other ethylenically unsaturated compounds as to leave substantially intact the essential dichlorobutadiene polymer structure, which condition will be fulfilled if the dichlorobutadiene constitutes 90% or more by weight of the copolymer. Below this percentage, the softening point of the resin becomes undesirably low, and the crystalline properties of the resin begin gradually to taper off. As to the unsaturated compounds employed as comonomers, these may be any compounds polymerizable by unsaturation-addition, providing that they are noncrosslinking, i. e., that there is only a single unsaturated ethylenic group in the compound, or if there are two, that they are conjugated or cross-conjugated. Examples of suitable polymerizable monounsaturated compounds are vinyl compounds on the order of vinyl chloride, vinyl acetate, vinyl bromide, vinyl methyl ketone, vinyl ethyl ketone, styrene, the nuclearly mono- and dichlorinated styrenes, vinyl pyridine, vinyl carbazole and the like; vinylidene compounds on the order of vinylidene chloride, vinylidene fluoride, methyl isopropenyl ketone, and the like; acrylic compounds such as acrylic and methacrylic acids, esters and nitriles on the order of ethyl acrylate, methyl methacrylate, methacrylic acid, acrylamide, propyl methacrylate, acrylonitrile and a-methacrylonitrile; maleic derivatives such as diethyl maleate, diethyl fumarate, maleic anhydride, α-cyano acrylic acid, and the like. Likewise there may be employed doubly unsaturated compounds provided that the two unsaturated groups as mutually conjugated or cross-conjugated, such as butadiene-1,3; chloroprene; isoprene; 2,3-dimethylbutadiene-1,3; fluoroprene; the methyl pentadienes; divinyl ketone; and the like.

RESINS SUITABLE FOR THE PRACTICE OF THIS INVENTION

As briefly noted above, polymers of dichlorobutadiene as heretofore prepared by conventional methods have been infusible and ultimately insoluble products. In the light of the researches of the present applicant patentee, it appears that this infusibility is due primarily to the polymerizing habit of dichlorobutadiene, which tends to products having the normally expected dichlorobutadiene linear polymer chain structure

but having extremely high molecular weights (i. e., $n$ is an extremely large number) which prevent the polymer from fusing beyond at most a rubbery state. Thus Carothers 1,965,369 discloses (Examples 5–7) polymers of dichlorobutadiene which either immediately or very shortly set to infusible and insoluble masses. In the instance (p. 3, l. 60; Example 6, initial stages of high temperature polymerization) where initially soft products are obtained, these appear to be gels of very high molecular weight polymer dispersed in unpolymerized dichlorobutadiene. That the polymerized portion of the material in these cases is of extremely high molecular weight but of non-crosslinked, normal structure may be demonstrated by conducting a polymerization as described in Example 6 of Carothers 1,965,369, but interrupting the polymerization at several percent conversion and precipitating the polymerized material by agitation with methyl ethyl ketone. The precipitated material is re-dissolvable in boiling toluene, indicating no very extensive cross-linking of this initial polymer. However, the precipitated material is quite infusible; it may be sintered into an opaque button in a hot press, but will not flow out into a plaque. Dichlorobutadiene polymerization masses permitted to go to completion under the above conditions become insoluble as well as infusible, apparently due to cross-linking, for which the extremely high molecular weight of the polymer affords ample opportunity. Such cross-linking is in despite of the general polymerizing habit of dichlorobutadiene, which appears to avoid cross-linking even at relatively high molecular weights, witness the fact that polymers can be produced which are soluble but not fusible.

It has been discovered by this invention that if means are taken to limit or reduce the molecular weight of dichlorobutadiene polymers to values corresponding to intrinsic viscosities of from 0.1 to 1.5, the polymers have properties of typical crystalline resins such as the nylon, polyethylene and vinylidene chloride resins. Thus, they may be melt-extruded, quenched to solidify them in an amorphous state, and thereafter stretched to several times their original length, whereby they become converted to oriented-crystalline products having high tensile strength, toughness and flexibility. This criterion of molecular weight range appears to be sufficient for operativeness of the resin in this invention: complications due to cross-linking do not arise except when the molecular weight has increased considerably beyond the intrinsic viscosity range set forth.

A less essential, but very advantageous qualification for the resins to be used in this invention is that the resins shall have a crystalline melting point of from 130° C. to 210° C. as determined by extinction of the X-ray pattern of a sample of the resin in question, or by disappearance of dichroism when the resin specimen is examined between crossed optical polarizing elements. Below the lower limit, the resin is undesirably soft and subject to heat-shrinkage. The upper limit is approximately the maximum crystalline melting point attainable. The crystalline melting point appears to be independent of the molecular weight, and to be a function of the local topography of the polymer molecules. This local topography is determined primarily by the temperature of polymerization, the crystalline melting point being inverse to the temperature of polymerization, and is determined to a very much smaller degree by the system of polymerization. The feature which determines the crystalline melting point of the resin appears to be the proportion of cis- and trans-configurations of the unsaturated groups along the chain, since from experimental work it appears that the only other likely possibility, namely occasional 1,2-polymerization configuration, does not constitute any large part of the dichlorobutadiene polymer chain.

TECHNIQUES FOR THE PREPARATION OF SUITABLE RESINS

The intrinsic viscosity of the dichlorobutadiene polymers and copolymers employed in this invention is a well-known measurement customarily made upon linear high polymers which, for any given type of polymer, is primarily a function of the molecular weight of the polymer. However, the measurement does vary slightly with the solvent and temperature at which the underlying viscosity measurements are made. The instrinsic viscosities referred to hereinabove and hereinafter are those based upon viscosity measurements made upon solutions of the resins in o-dichlorobenzene at 110° C.

At noted above, the intrinsic viscosity of the dichlorobutadiene polymers, as in the case of other polymers, is a function primarily of the molecular weight of the polymers. The exact nature of the function is still in dispute however, and the polymers employed in this invention are therefore characterized in terms of their definitely ascertainable property, namely intrinsic viscosity.

Techniques which have been found to yield polymers and copolymers of dichlorobutadiene having molecular weights (intrinsic viscosities) within the necessary ranges are:

1. Subjecting any infusible polymer or copolymer of dichlorobutadiene, prepared in accordance with the prior art, to a restrained chlorination confined to the introduction of from 3 to 5% of chlorine, based on the weight of polymers and copolymers.

2. Polymerizing dichlorobutadiene or mixtures thereof with copolymerizable compounds in the presence of from 0.05 to 2.0%, or in the case of some less powerful modifiers, as high as 10.0%, based on the weight of the materials polymerized or copolymerized, of a mercaptan-type modifier such as employed in the synthetic rubber industry.

3. Polymerizing 2,3-dichlorobutadiene or mixtures thereof with copolymerizable compounds in solution in organic solvents at temperatures in excess of 120° C. in the presence of inhibitors such as p-cresol employed to the extent of about 1%, based on the weight of dichlorobutadiene. Due to the high polymerizing temperature, this material will have an unduly low softening point, less desirable in oriented products.

These techniques will now be discussed in detail and for the sake of brevity, they will be discussed as applying to the polymerization of undiluted dichlorobutadiene. It will be understood, however, that the same techniques may be applied to mixtures of dichlorobutadiene with other unsaturated compounds copolymerizable therewith, and when so applied will yield copolymeric resins having the same crystalline properties as the polymers of unmixed dichlorobutadiene, provided that the copolymers contain at least 90% of dichlorobutadiene. It will be understood that dichlorobutadiene is an extremely rapidly polymerizing compound and that, in order to introduce quantities as high as 10% of the extraneous comonomer into the resin, the concentration of the unpolymerized comonomer in the polymerizing system must be relatively higher, usually about 70%, based on the total weight of unpolymerized dichlorobutadiene and comonomer. If lesser quantities than 10% of the comonomer are desired in the copolymer, lesser proportions than 70% of the comonomer will be present in the mixture copolymerized. It will be understood that the polymerizing process rapidly and preferentially exhausts the monomeric dichlorobutadiene from the polymerization mixture, so that the relative concentration of the extraneous comonomer increases as the reaction proceeds. If no special measures are taken, this will lead, in the later stages of the polymerization, to the production of copolymers containing excessive quantities of the extraneous comonomer. To prevent this, the concentration of the unpolymerized comonomer must never be permitted to rise above about 70%, based on the total weight of unpolymerized dichlorobutadiene and comonomer. This may be effected by periodically adding supplemental dichlorobutadiene to the polymerization mass during the polymerization, whenever the analysis thereof shows that the concentration of the unpolymerized comonomer has become excessive.

THE RESTRAINED CHLORINATION TECHNIQUE

In those cases where an already polymerized dichlorobutadiene is subjected to the restrained chlorination technique, the original polymerization of the dichlorobutadiene may be carried out by any means conventional in the polymerization of unsaturated compounds, since the chlorination appears to reduce the excessively high molecular weight of polymers of dichlorobutadiene as produced by the said conventional methods. Thus, the polymerization may be effected in mass, in solution, in aqueous emulsion or in suspension. Likewise the polymerization may be conducted in the presence of catalysts, and/or in accordance with any of the procedures usual in the preparation of polymeric resins from unsaturated organic compounds. For example, a number of suitable methods for the polymerization of dichlorobutadiene to produce insoluble and infusible resins are disclosed in the patent to Carothers et al. 1,965,369. Inasmuch as dichlorobutadiene polymerizes with extreme readiness, no particular difficulty will be encountered in the conventional polymerization thereof aside, of course, from the fact that the products will be infusible. Any of the polymeric dichlorobutadienes prepared without special precautions as above outlined may be converted into crystallizable and orientable resins by subjecting them to restrained chlorination as will now be more fully described.

Referring to the restrained chlorination, this involves the introduction of strictly limited amounts of chlorine into the polymers, so that the net chlorine content thereof is not significantly increased. It appears that the chlorination reduces the excessive molecular weight of the polymers formed during the usual methods of polymerization of dichlorobutadiene, and that the linear polymeric chains are thereby enabled to crystallize and to be oriented by mechanical elongation. Whatever the cause, the treatment, with small amounts of chlorine, of the worthless polymers of dichlorobutadiene as prepared in the prior art, renders them fusible and susceptible of crystallization and orientation by mechanical stretching.

The unit process of restrained chlorination of the dichlorobutadiene may be carried out in any appropriate manner and, since the polymer will generally occur as a powdered solid, is most conveniently effected by suspending the polymer in a suitable inert solvent and introducing chlorine into the resultant mixture. Suitable inert solvents for this purpose are chloroform, carbon tetrachloride, ethylene dichloride and the like. The chlorine is introduced into the solution with sufficient agitation to insure contact of the reactants and homogeneity of the reaction mass. The temperature at which the chlorination is conducted is not critical, and may range from 100° C. down to the lowest temperature at which an economic rate of reaction prevails. The total amount of chlorine introduced is quite critical, and must be strictly limited, as otherwise infusible products result. The introduction of 3% to 5% of chlorine, based on the weight of dichlorobutadiene polymer, will result in fusible, highly crystalline products having intrinsic viscosities in the range 0.10 to 1.5.

THE TECHNIQUE OF POLYMERIZATION IN THE PRESENCE OF MODIFIERS

In general, it has been found that if dichlorobutadiene is polymerized in mass, solution, aqueous suspension or aqueous emulsion, in the presence of from 0.05% to 15%, based on the weight of dichlorobutadiene, of those substances designated "modifiers" in the synthetic rubber industry, the resultant polymers will have the specific viscosities lying in the range 0.1 to 1.5 and will in consequence be fusible and crystallizable by stretching. Suitable modifiers are in general any hydrocarbon mercaptans or dimercaptans, i. e., hydrocarbon compounds containing from 1 to 20 carbon atoms, one or two of the hydrogen atoms of which are replaced by a sulfhydryl (S-H) group. Examples of such modifiers are the alkyl mercaptans containing from 1 to 20 carbon atoms such as methyl mercaptan, ethyl mercaptan, propyl mercaptan, isopropyl mercaptan, t-butyl mercaptan, amyl mercaptan, octyl mercaptan, t-octyl mercaptan (based on diisobutene) 2-ethyl hexyl mercaptan, tertiary dodecyl mercaptan (prepared from triisobutene) hexadecyl mercaptan, eicosyl mercaptan and the like; alkylene dimercaptans such as tetramethylene dimercaptan, decamethylene dimercaptan, and the like; cycloalkyl mercaptans such as cyclohexyl mercaptan; aromatic mercaptans such as thiophenol, α- and β-thionaphthol, the thiocresols and thioxylenols and the like; aralkyl mercaptans such as benzyl mercaptan, 2-phenyl ethyl mercaptan and the like; and mercaptans containing the hydrocarbon radicals of naval stores products such as thioabietinol, α-pinene mercaptan, hydrogenated and disproportionated thioabietinol, terpenyl mercaptans, etc. Likewise suitable are mercaptans of the foregoing type which contain not more than three innocuous groups such as hydroxyl groups, ether and thioether linkages, carboxylic acid groups and carboxylic ester groups. Examples of such substituted mercaptans are thiosalicylic acid, thioglycol, and the ether and thioether mercaptans produced by reacting propylene and other alkylene 1,2 sulfides with water or alcohols. Likewise there may be employed thiol acids such as thiolacetic acid etc. In addition, of course there may be employed compounds which liberate mercaptans under the conditions of reaction, such as esters of mercaptans with acids, diisopropyl xanthogen disulfide, etc. The different types of modifiers vary considerably in their efficacies. Accordingly, the amounts to be employed will vary (within the range of 1-15% cited above) as set forth in the following table.

Table A

| Type of Modifier | Amount to be used (%, based on weight of dichlorobutadiene in polymerization mass) |
|---|---|
| Aryl mercaptans (containing —SH groups directly attached to aromatic nuclei) | 0.05 to 2.0 |
| Aliphatic, cycloaliphatic, and araliphatic mercaptans (containing from 1 to 8 carbon atoms) | .5 to 5.0 |
| Aliphatic, cycloaliphatic and araliphatic mercaptans (containing from 9 to 20 carbon atoms) | 2 to 15 | when the minimum cited quantities of modifiers are used, the products will be much harder and much less flexible than when the maximum cited quantities of such mercaptans are employed, and the properties of the products may be varied by adjusting the quantity of modifiers employed.

The polymerizations of the monomer dichlorobutadiene in the presence of the mercaptan type modifiers may be carried out by any of the conventional polymerization manipulative procedures, such as mass polymerization in which the monomer, substantially undiluted except for minor proportions (up to say 5%) of catalysts, modifiers, etc., is permitted to polymerize; solution polymerization, in which the monomer, together with the modifiers, any desired catalysts etc. is dissolved in a suitable inert organic solvent such as toluene, benzene, methanol, α-hydroxyethyl ether or the like, and permitted to polymerize; suspension polymerization, in which the monomer is suspended as relatively large, non-emulsified droplets in an aqueous medium and permitted to polymerize; and emulsion polymerization in which the monomer is emulsified in an aqueous medium containing an emulsifying agent the molecules of which comprise a total of from 8 to 22 carbon atoms attached to hydrophilic solubilizing groups, such as the sodium fatty acid soaps on the order of sodium or potassium laurate, myristate, oleate, palmitate and stearate; fatty sulfate and sulfonate emulsifiers containing from 8 to 22 carbon atoms per molecule such as the sodium salts of sulfates of lauryl, myristyl, oleyl, palmityl and stearyl alcohols; or of the mixed fatty alcohols derived by hydrogenation of cocoanut oil fatty acids or other fatty acids derived from natural glyceride oils; the sodium salts of sulfonated petroleum fractions or sulfonated Fischer-Tropsch products and the like; sodium salts of alpha sulfonated α,β-unsaturated dicarboxylic acids such as the sodium (2-ethyl hexyl) sulfosuccinate; fatty acid monoesters of the hexitans; mono-sulfated monoglycerides of higher fatty acids, sulfonated aryl and alkylated aryl compounds such as didodecyl naphthalene sulfonate; and the like. The polymerization is preferably carried out in a closed vessel in which the space not occupied by the reactants is maintained free of oxygen, as the induction period of the polymerization reaction is lengthened by the presence of oxygen and the reaction proceeds in a more erratic fashion. The polymerization may be carried out over a wide range at temperature, for instance from −30° C. to 70° C., the chief limitation being those of preventing freezing at low temperatures and boiling at high temperatures. At low temperatures, antifreeze components such as methanol will be employed. As noted above, the polymerization may be promoted by the addition of free-radical-generating catalysts. In contrasts to the majority of polymerizable unsaturated compounds, dichlorobutadiene does not absolutely require the presence of such catalysts for its polymerization; however the presence of the catalysts does in some cases assure a more rapid onset of the reaction and more reproducible results. Suitable free-radical-generating catalysts include hydrogen peroxide, sodium, potassium or ammonium persulfates and perborates, benzoyl peroxide, acetyl peroxide, di-t-butyl peroxide and the like.

SOLUTION POLYMERIZATION IN THE PRESENCE OF INHIBITORS OF HIGH TEMPERATURES

It has also been found that suitable crystalline polymers of dichlorobutadiene may be produced by polymerization of this monomer in solution in inert organic solvents at elevated temperatures in the presence of an inhibitor. Suitable solvents are benzene, toluene, xylene, β-ethoxy ethanol, methanol and the like, which solvents may be employed in proportions from 1 to 4 parts by weight for each part by weight of dichlorobutadiene monomer. Suitable inhibitors are exemplified in hydroquinone, p-cresol and the like. The temperature of polymerization should be about 120° C., and the inhibitor should be present to the extent of about 1%, in order to produce crystalline resins. The resultant resins will have intrinsic viscosities in the range 0.1 to 1.5, and will be suitable for use in this invention.

THE FABRICATION OF THE DICHLOROBUTADIENE POLYMERS

The fusible dichlorobutadiene resins prepared as above described may be extruded by pressure through dies at their softening temperatures, which vary from about 120° C. to about 230° C., depending chiefly upon the temperature of polymerization. The die may be of any desired size and shape, so that the extrudate may take the form of fine filaments (filaments on the order of .0005–.001 inch in diameter) coarse monofilament fibers (on the order of .001–0.1 inch in diameter)

such as artificial rattan and straw; tubing; films; sheets; contoured sections; and the like. The freshly extruded polymer is quickly cooled (in the case of the fine filaments, a contact with cold air will suffice; the coarser products should be quenched in a water-bath at room temperature or lower) whereby it becomes converted to a condition from which it may be cold-drawn. The quenched extrudate is then elongated to from 2 to 6 times its original length, for instance by passage over differential drawing rolls or by drawing over snubbing pins or through dies. The extrudate thereby is converted to an oriented-crystalline state with the crystals oriented in the direction of the length of the extrudate, which in this state is characterized by outstanding tensile strength, on the order of 30,000–60,000 pounds per square inch; flexibility; transparency; and toughness. When subjected to X-ray examination, the extrudate will exhibit the pattern shown in Fig. 1, the constants and direction of specimen being as described below under "The crystalline structure of the unidirectionally oriented articles of this invention." As will appear hereinbelow, the state of crystallinity indicated by the diagram of Fig. 1 is metastable, and a more closely packed crystalline configuration has greater thermodynamic stability. However, at room and moderately elevated temperatures (up to 70° C.) the extrudate will retain the crystalline configuration of Fig. 1 for an indefinitely long period of time.

As noted above, the extrudates may take the form of films or sheets. In such cases, if the quenched article is stretched in a single direction, the resulting crystal will be oriented in that single direction. However, it is also possible to stretch films and sheets in simultaneously two directions—lengthwise and widthwise—in which case the resultant crystals will not have an exclusive orientation lengthwise of the film, but will be oriented parallel to the surface of the film.

The resins of this invention have a high degree of heat stability, which facilitates certain alternative and supplemental thermal treatments involving long exposure to elevated temperatures as will now be described.

The quenched and oriented extrudates prepared as above described may be further heated at temperatures on the order of 80° C. to 160° C. either without restraint, or with application of sufficient tension to prevent the shrinkage thereof which otherwise occurs. In the course of from 10 to 30 minutes the extrudate gradually increases in tensile strength up to values on the order of 50,000 pounds per square inch. The resistance of the extrudate to shrinkage at higher temperatures, on the order of 100° C., is also greatly enhanced by this treatment. During the course of the treatment, the X-ray pattern of Fig. 1 diminishes in intensity, and is superseded by the X-ray pattern of Fig. 3, both patterns being superimposed during the conversion as indicated in Fig. 2.

Another process involves heating the extruded and oriented articles to temperatures from 10° C. to 60° C. below the crystalline softening temperature of the resin, thereafter further elongating the article and finally cooling the article in its elongated state. The resulting product is characterized by a very high degree of crystallinity, and by extremely high tensile strength on the order of 60,000–100,000 pounds per square inch. In this case, likewise, the X-ray pattern of the final product is that of Fig. 2.

Still another process consists in melting and extruding the resin, and slowly cooling the same without any attempt to achieve the amorphous state attained upon chilling. The extruded articles is then reheated to temperatures from 10° C. to 60° C. below the softening point of the resin, stretched to from three to nine times its original length, and cooled in stretched condition. The resultant products, when the stretching is carried beyond 4 or 5 times the original length of the extruded articles, are, similarly to the products described in the preceding paragraph, characterized by extremely high tensile strength, on the order of 60,000 to 100,000 pounds per square inch. Both the products described in this and the preceding paragraph exhibit the oriented X-ray pattern of Fig. 3. The process set forth in this paragraph is particularly applicable to the production of extrudates having a thickness, before stretching, of one-eighth inch or more, as products of this thickness cannot be quenched rapidly enough for the attainment of the amorphous condition required in the other processes.

COMPOUNDING OF THE DICHLOROBUTADIENE RESINS

The crystalline resins employed in this invention, similarly to the nylon and saran resins, are not readily compatible with conventional plasticizing agents. This is probably inherent in the crystalline resinous state, in which the resinous molecules prefer contact with neighboring molecules of their own species, to the exclusion of foreign molecules such as plasticizer molecules. It has been found, however, by associates of the present applicant patentee, that the resins may be plasticized by the addition of from 5% to 20%, based on the total weight of plasticizer and resin, of phenyl salicylate or of phenyl salicylate containing one or more hydrocarbon substituents in the phenyl nucleus, the total number of carbon atoms in the hydrocarbon group or groups on any such phenyl nucleus not exceeding 22. In common also with all organic material, the dichlorobutadiene resins are subject to a definite, although not excessive, deterioration by the action of actinic light and oxygen. Various stabilizing compounds and combinations of compounds have been discovered by the applicant patentee and his associates, notably the mercaptol stabilizers and combinations thereof with other materials disclosed in the patent to Rowland and Reid, 2,445,739. Likewise effective have been found combinations involving stannous normal salts of catechol and alkylated catechols with phenyl salicylate—the latter acting supplementarily as a plasticizer.

The resins are also compatible with pigments, lakes, delusterants, metallic powders, etc., to provide pleasing colors and aesthetic effects. They are also compatible with the conventional oil-soluble dyes to the extent required for tinctorial purposes. The resins are also compatible with rubbery butadienestyrene copolymers, the intermixture being effected by coagulation of mixed latices of the two materials. In the combination, the butadiene-styrene copolymer serves as a non-fugitive plasticizer, and the mixtures may be extruded and oriented similarly to the unmixed dichlorobutadiene resins.

THE CRYSTALLINE STRUCTURE OF THE UNIDIRECTIONALLY ORIENTED ARTICLES OF THIS INVENTION

Similarly to the archetypical oriented crystalline nylon and polyvinylidene chloride resin products, the unidirectionally oriented articles of this invention exhibit X-ray crystalline fiber diffraction patterns, which are shown in Figures 1-3. All of these figures were obtained on planar photographic films disposed normally to the beam of X-rays and at an approximate distance of 5 cm. from the specimen. The radiation employed was from a copper target, excited by a 20,000 volt beam, with a nickel filter. The direction in which the specimen had been stretched in the orientation process was parallel to the arrows A on the figures.

The pattern of Fig. 1 was obtained from a fiber produced by simple melt extrusion of the resin, water quenching and stretching as described in Example XI hereinafter. The pattern is characterized by an equatorial doublet consisting of a spot of 1a 1.65 cm. from the center and a spot 1b 1.55 cm. from the center. It is also characterized by another equatorial spot 2 2.2 cm. from the center, and by a meridional spot 3 1.65 cm. from the center.

The pattern of Fig. 3 was obtained from a fiber produced by "superstretching" a filament in a hot water bath as described under "Superstretching" in Example XI hereinafter. This pattern contains spots 1a and 2 identical with the spots 1a and 2 of Fig. 1, indicating the retention of that portion of the basic structure of the filament of Fig. 1 corresponding to spots 1a and 2. The spots 1b and 3 of Fig. 1 do not appear in Fig. 3. A new meridional spot 4, 1.9 cm. from the center has developed in Fig. 3. Likewise there appear in Fig. 3 a series of spots, 5, 6, 7, 8 having Cartesian coordinates tabulated herewith in Table B, the origin being at the center of the diagram, the ordinates being measured parallel to the direction of the fiber (arrow A) and the abscissae being measured at right angles to the direction of the fiber. Likewise tabulated in Table B, upon the same system of coordinates, are the coordinates of the spots 1a, 1b and 3.

polymer of dichlorobutadiene having the structure (—$CH_2$—CCl=CCl—$CH_2$)$_x$

PROPERTIES AND USES

The oriented crystalline products of this invention have extremely high tensile strengths, from 30,000 to 100,000 or more pounds per square inch; have high softening temperatures (on the order of 200° C.) and shrinkage temperatures (on the order of 120° C.); have excellent toughness and flexibility (specimens plasticized with 10% of 2-methyl-phenyl salicylate will survive 200,000 cycles in an M. I. T. folding endurance tester). The products have excellent resistance to chemical and heat deterioration and good resistance to deterioration by actinic light. The products also exhibit excellent resistance to the transmission of water vapor therethrough. In the form of relatively coarse monofilaments, therefore, the products find application as artificial rattan and horsehair seating, upholstery, drapery, luggage, and shoe-covering fabrics; as cordage for clotheslines, picture hanging, fishnets, tethers and lanyards for writing and other implements, haberdashery items such as belts and suspenders, insect and filter screening and the like. In the form of strong, tough transparent films, the products are suitable for packaging commodities, particularly commodities which are deteriorated by access or loss of moisture, such as machines and machine components, hardware, hygroscopic, hydrolysible or efflorescent chemicals, food products, baked goods and the like. The relatively heavy extrudates may take the form of tubing, pipes, contoured sections, counter-nosings and similar products.

With the foregoing general discussion in mind, there are given herewith detailed examples of the practice of this invention. All parts given are by weight.

Table B

| | SPOT | | | | | | | | |
|---|---|---|---|---|---|---|---|---|---|
| | 1a | 1b | 2 | 3 | 4 | 5 | 6 | 7 | 8 |
| Ordinate, cm | 0 | 0 | 0 | ±1.65 | 0 | ±1.7 | ±1.73 | ±1.8 | ±1.9 |
| Abscissa, cm | ±1.65 | ±1.55 | ±2.2 | 0 | ±1.9 | ±0.55 | ±1.05 | ±1.9 | ±2.3 |

The pattern of Fig. 2 is taken from a filament prepared by simple melt extrusion, quenching and stretching as described in Fig. 1, followed by heating the filament in an oven at 100° C. During the heating of the filament, the X-ray pattern gradually changed from that of Fig. 1 to that of Fig. 3. Fig. 2 is an X-ray diagram taken from the filament in an intermediate stage, and it will be seen that this diagram contains all of the spots of both Figs. 1 and 3 superimposed.

The above patterns, and particularly spots 1a and 2, are characteristic of the unidirectionally oriented crystalline products of this invention; and it is beyond the range of practical probability that there could exist another state of aggregation of matter yielding the identical X-ray fiber diagram. Calculated on the basis of the spot 3, the fibers have an identity period of 4.86 A., which is in good agreement with the value calculated on a stereochemical basis for the linear

EXAMPLE I.—RANGE OF INTRINSIC VISCOSITIES

| | Parts |
|---|---|
| Water | 330 |
| Dichlorobutadiene | 100 |
| Alkyl sodium sulfonates [1] | 1.0 |
| Potassium persulfate | .02 |
| Thiophenol | Per Table I |

[1] MP-189-EF manufactured by E. I. du Pont de Nemours & Co. The sodium salts of the products of sulfonation of 10 to 16 carbon-atom paraffins under exposure to ultraviolet light. Free of electrolytes.

A series of polymerization runs was made in accordance with the above recipe, varying the thiophenol from run to run as set forth hereinbelow in Table I to produce a series of polymers ranging in workability from the infusible and insoluble polymers described in the prior art to the softest polymers suitable for use in this invention.

In each case the selected amount of thiophenol, together with the other ingredients in the quantities listed in the recipe, were sealed into a bottle under anaerobic conditions and agitated at from 30° C. to 40° C. until 50% of the dichlorobutadiene had become converted to the polymer. The resultant latex was then coagulated by addition of methanol, and the coagulum dewatered by filtration, washed with water on the filter, and dried.

The intrinsic viscosity of each polymer was then determined, using ortho dichlorobenzene as the solvent and 110° C. as the temperature at which the viscosity measurements were made.

Likewise (where possible) each polymer was melt-extruded at 215° C. through a die .018 inch in diameter into a quenching bath of water maintained at 20° C., and thereafter stretched to four times its original extruded length. The stretching was characterized by the phenomena attending the elongation of quenched crystalline resins such as nylon and polyvinylidene chloride, i. e., the filament necked down to form an oriented portion which grew at the expense of the unoriented portion. The oriented filament was quite transparent and flexible and had a tensile strength on the order of 35,000 pounds per square inch. Tabulated herewith are the amounts of the thiophenol employed, and the intrinsic viscosity and the melt extrusion properties of the resultant polymers:

Table I

| Thiophenol Employed, Parts | Intrinsic Viscosity Of Polymer | Extrusion Properties of Polymer |
|---|---|---|
| 0.0 | | Polymer was completely infusible and insoluble. |
| 0.015 | 2.00 | Polymer was soluble to the extent of about 1% in o-dihclorobutadiene at 110° C.; will not flow under heat and pressure. Could not be extruded. |
| 0.02 | 1.5 | Rather stiff melt without plasticizer; extrusion was facilitated by addition of 5% of 2,4-diamylphenyl salicylate, based on weight of the polymer. Excellent oriented filament obtained. |
| 0.03 | 1.05 | Do. |
| 0.05 | .8 | Plasticizer unnecessary; fairly stiff melt; excellent oriented filament obtained. |
| 0.10 | .5 | Do. |
| 0.15 | .43 | Do. |
| 0.20 | .35 | Melt is quite fluid; excellent oriented filaments obtained. |
| 0.40 | .28 | Do. |
| 1.6 | .12 | Very thin melt, tends to run out of the orifice; suitable for the extrusion of very fine filaments. |

EXAMPLE II.—ALKYL MERCAPTAN MODIFIERS

| | Parts |
|---|---|
| Water | 400 |
| Dichlorobutadiene | 100 |
| Sodium lauryl sulfate | 1 |
| Potassium persulfate | .1 |
| Alkyl mercaptan (per Table II) | 1.67 |

A series of polymerization runs was made in accordance with the above recipe, using different alkyl mercaptans in the different runs, as set forth below in Table II. In each run, the selected mercaptan, together with the other ingredients set forth in the recipe, was charged into a bottle, which was flushed with nitrogen to provide anaerobic conditions, and sealed. The bottle was then agitated at 20° C. until 50% of the dichlorobutadiene had become polymerized. The polymer was then isolated and the intrinsic viscosity thereof determined as described in Example I. Set forth herewith in Table II are the various mercaptans employed, and the intrinsic viscosities of the resultant polymers.

Table II

| Mercaptan Employed | Intrinsic Viscosity of Polymer |
|---|---|
| methyl | 0.25 |
| ethyl | 0.10 |
| propyl | 0.30 |
| t-butyl | 0.25 |
| amyl | 0.60 |

These polymers also were extruded and cold-drawn as described in Example I to yield fibers having excellent tensile strength and other desirable mechanical properties.

EXAMPLE III.—MISCELLANEOUS MODIFIERS

| | Parts |
|---|---|
| Water | 330 |
| Dichlorobutadiene | 100 |
| Alkyl sodium sulfonates (same as in Example I) | 1 |
| Potassium persulfate | .02 |
| Modifying agent (set forth in Table III) | Per Table II |

A series of polymerization runs was made in accordance with the above recipe, using different modifying agents in the quantities set forth in Table III hereinbelow.

In each case, the selected modifying agent, in the quantity set forth in Table III for that modifying agent, and the other ingredients listed in the recipe, were sealed into a bottle which was flushed out with nitrogen so as to provide anaerobic conditions. The bottle and contents were then agitated at 30°–40° C. until 50% of the dichlorobutadiene had become polymerized. The resultant polymer was isolated and the intrinsic viscosity thereof determined, as set forth in Example I. Tabulated herewith in Table III are types and amounts of modifiers employed in the several runs, together with the intrinsic viscosities of the resultant polymers.

Table III

| Modifier Used | | Intrinsic Viscosity of Polymer |
|---|---|---|
| Type | Amount, parts | |
| Diisopropyl xanthogen disulfide | 5.0 | .11 |
| t-dodecyl mercaptan "Sharples 3-β Mercaptans" manufactured by Sharples Chemicals, Inc. | 4.0 | .15 |
| n-dodecyl mercaptan | 7.0 | .12 |
| commercial amyl mercaptans | 1.6 | .10 |
| thiophenol | .45 | .20 |
| thio-β-naphthol | .4 | .12 |
| thio-α-naphthol | .35 | .10 |
| tetramethylene dimercaptan | 1.2 | .3 |
| cetyl marcaptan | 15.0 | .2 |

EXAMPLE IV.—SOLUTION POLYMERIZATION

| | Parts |
|---|---|
| Dichlorobutadiene | 6 |
| β-Ethoxyethanol | 10 |
| Modifier (per Table IV) | 0.06 |

A series of polymerization runs was made in accordance with the foregoing recipe, using one of the modifiers set forth in Table IV below in each of the runs. In each case, the selected modifier was sealed up in a bottle with the remainder of the ingredients listed, and agitated at 25° C. for 48 hours. The polymer which separated from the solution was removed by filtration, washed on the filter with methanol, and dried. The intrinsic viscosity of the polymer was determined as described in Example I. Set forth herewith in Table I are the various modifiers employed and the intrinsic viscosities of the resultant polymers.

Table IV

| Modifier Employed | Intrinsic Viscosity of the Polymer |
|---|---|
| 3-thiophene-thiol | .36 |
| Thioglycolic acid | .65 |
| Thiophenol | .26 |
| Diisopropyl xanthogen disulfide | 1.00 |
| t-Dodecyl mercaptan [1] | .96 |
| Amyl mercaptan [2] | .35 |

[1] 4 parts of this modifier used, rather than .06 part.
[2] 2.5 parts of this modifier used, rather than .06 part.

The polymers prepared as above described were extruded and cold-drawn to yield filaments similar to those of the preceding examples.

EXAMPLE V.—METHANOL SOLUTION POLYMERIZATION

| | Parts |
|---|---|
| Methanol | 320 |
| Dichlorobutadiene | 100 |
| Amyl mercaptan | 1.67 |

The above ingredients were agitated together at 25° C. for 56 hours. The resultant polymer was filtered off from the solution, washed on the filter with methanol, and dried. The resin had an intrinsic viscosity of 0.45 and was melt-extruded and oriented to yield fibers similar to those of the preceding examples.

EXAMPLE VI.—MASS POLYMERIZATION

| | Parts |
|---|---|
| Dichlorobutadiene | 12 |
| Thiophenol | .02 |

The above ingredients were placed in a bottle which was then flushed with nitrogen and sealed. The bottle was then agitated at 25° C. for 62 hours, at the end of which time 87% of the dichlorobutadiene had polymerized. The resultant resin was isolated from the reaction mass, and its intrinsic viscosity found to be 0.48. The resin was extrudable and orientable similarly to the resins of the preceding examples.

EXAMPLE VII.—COPOLYMERS

| | | Parts |
|---|---|---|
| Water | parts | 400 |
| Dichlorobutadiene } Comonomer | parts total | 100 |
| Sodium lauryl sulfate | part | 1 |
| Potassium persulfate | do | .1 |
| Thiophenol | do | .15 |

A series of polymerization runs was made in accordance with the foregoing recipe, using various selected polymerizable unsaturated compounds as comonomers in the several runs. In each run, the dichlorobutadiene and the selected comonomer were used in such amounts as to provide a total of 100 parts, which, together with the other ingredients of the recipe, were placed in a polymerization bottle which was then flushed out with nitrogen and sealed. The proportions of the dichlorobutadiene and comonomer were selected in the light of experience to yield a copolymer containing from 95% to 98% of dichlorobutadiene copolymerized therein. The bottle was then agitated at 25° C. until about 10% of the dichlorobutadiene and comonomer had become polymerized, whereupon the reaction was arrested by injection of phenyl-β-naphthylamine. This was done to avoid any excessive exhaustion of dichlorobutadiene (by far the more highly reactive monomer) from the system, which exhaustion would have resulted in inhomogeneity of the copolymer. The resultant latex was coagulated by means of methanol, and the resultant coagulated resin dewatered on a filter, washed with methanol, and dried. A chlorine analysis was made on each copolymer and the proportion of dichlorobutadiene copolymerized therein was calculated. Likewise additional experiments were made with certain of the comonomers to determine the reactivity ratios thereof in conjunction with dichlorobutadiene, the general method used being that of Lewis et al. J. A. C. S. 70:1519–1523 and the polymerization system being that of the present example. Tabulated herewith are the comonomers employed; the percent of comonomer, on the basis of the total weight of comonomer and of dichlorobutadiene, charged to the polymerization vessels; the percent of comonomer entering into the copolymer; and, in those cases in which this value was determined, the reactivity ratios of the dichlorobutadiene and comonomer. As tabulated, the ratios $r_1$ and $r_2$ are on the basis that the dichlorobutadiene is the monomer "$M_2$" and that the comonomer is the monomer "$M_1$" under the notation of Lewis et al., cited above.

Table VII

| Comonomer | Weight Per Cent Comonomer | | Reactivity Ratios | |
|---|---|---|---|---|
| | In Charge | In Copolymer | $r_1$ | $r_2$ |
| methyl pentadiene | 15 | 3 | | |
| vinyl acetate | 90 | 1 | | |
| vinyl chloride | 50 | 2.5 | | |
| methacrylic acid | 65 | 5 | | |
| vinyl pyridine | 30 | 2 | 0.01 | 11.0 |
| acrylonitrile | 45 | 4.5 | 0.02 | 18 |
| 2,5-dichlorostyrene | 13 | 4 | 0.3 | 7.0 |
| isoprene | 19 | 3.3 | 0.01 | 6.5 |
| monochlorostyrene | 22 | 4.0 | | |
| vinylidene chloride | 75 | 4.0 | 0.125 | 11.3 |
| butadiene | 42 | 3 | 0.06 | 8.2 |
| methyl methacrylate | 45 | 4.5 | | |
| styrene | 35 | 5 | .01 | 9 |
| 3-methylene-1,4-dioxaspiro-4,5-decane [1] | 56 | 5.0 | | |
| methyl vinyl ketone | 63 | 3.0 | | |
| methyl vinyl ether | 32 | 2.5 | | |
| methacrylonitrile | 34 | 2.0 | | |
| ethyl hexyl acrylate | 60 | 5.0 | | |
| n-butyl acrylate | 50 | 4.0 | | |
| ethyl acrylate | 45 | 4.3 | | |
| α-methyl-styrene | 50 | 5 | | |
| lauryl methacrylate | 40 | 5 | | |

[1] In this case, the polymerization recipe was buffered by the addition thereto of 3 parts of sodium carbonate.

The resins prepared as above described were extruded as filaments, quenched, and oriented as described in the preceding examples to yield fibers of good tensile strength and flexibility. These fibers, similar to the fibers of the previous examples, exhibited the X-ray fiber diagram of Fig. 1. The resins had specific viscosities in the range of about 0.3–0.5.

It will be evident from the above experiments that dichlorobutadiene will copolymerize with the conventional polymerizable ethylenically unsaturated compounds, the dichlorobutadiene usually being by far the more active compound. Providing that the copolymers contain at least 90% of dichlorobutadiene copolymerized therein, they do not differ essentially from the polymer of unmixed dichlorobutadiene, and when prepared so as to have an intrinsic viscosity in the range of 0.1 to 1.5, they are orientable to yield crystalline fibers in accordance with this invention.

Example VIII.—Restrained Chlorination Technique

A. Preparation of polymer

|   | Parts |
|---|---|
| Dichlorobutadiene | 100 |
| Toluene | 100 |

The above ingredients were dissolved together and heated at 70° C. for two hours. The solution was then cooled, and filtered to separate the polymer. This polymer cannot be fused by heat and pressure, but can be made up into rather dilute solutions in hot solvents such as boiling carbon tetrachloride.

B. Restrained chlorination

|   | Parts |
|---|---|
| Carbon tetrachloride | 100 |
| Dichlorobutadiene polymer (prepared as just described) | 1 |
| Chlorine | .03 |

The dichlorobutadiene polymer and carbon tetrachloride were heated together to 70° C., whereby solution of the polymer in the carbon tetrachloride was effected. Chlorine was then bubbled into the solution for three minutes, at the end of which time the excess chlorine was swept out by bubbling air through the mass. The solution was then cooled, and the precipitation of the polymer accelerated by addition of methanol. The precipitated polymer was filtered off and dried. The quantity of chlorine absorbed during the chlorination step was about .03 part.

The polymer treated as above described was fusible to form a smooth and flowable melt. The polymer was melt-extruded, quenched and elongated as described in Example I, yielding a fiber having the X-ray diffraction pattern of Fig. 1. The polymer had an intrinsic viscosity of 0.39.

Example IX.—Polymerization Temperature Series

|   | Parts |
|---|---|
| Water [1] | 200 |
| Dichlorobutadiene | 100 |
| Alkyl sodium sulfonates (same as in Example I) | 1 |
| Potassium persulfate | .02 |
| Thiophenol | .15 |

[1] In the case of the run at —20° C., the water was replaced by a mixture of 66% water, 34% methanol.

A series of polymerization runs was made in accordance with the above recipe, using various temperatures in the range from —20° C. to +80° C. in the several runs. In each run, the ingredients of the recipe were charged into a polymerization bottle which was flushed with nitrogen, sealed and then agitated at the selected temperature until 60% of the dichlorobutadiene had become converted to the polymer. The bottle was then opened, the latex coagulated with methanol, and the precipitated resin dewatered and washed with water on a filter and dried. The melting point, as determined by observation in a capillary tube, density, and solubility in boiling carbon tetrachloride were determined. Likewise filaments were made from certain of the resins in accordance with the procedure set forth hereinbelow under Example XI and the tensile strengths thereof determined at various temperatures. Set forth herewith in Table IX are the temperatures at which the several polymerization runs were made, together with the properties of the resultant resins and filaments.

Table IX

|   | Polymerization Temperature ||||
|---|---|---|---|---|
|   | —20° C. | +5° C. | +30° C. | +80° C. |
| Softening Point, °C | 200 | 184 | 169 | 140 |
| Specific Gravity | 1.522 | 1.518 | 1.510 | 1.502 |
| Solubility-boiling CCl$_4$ | insol. | insol. | sol. | sol. |
| Tensile strength of filament, lbs./in.$^2$ at— |   |   |   |   |
| 25° C |   | 82,000 | 70,000 |   |
| 125° C |   | 40,000 | 23,000 |   |
| 175° C |   | 27,000 | 0 |   |

From the table, it will be evident that the dichlorobutadiene polymers tend, with lower polymerization temperatures, to denser crystalline packing as reflected in higher softening points, greater densities, diminished solubilities and increased tensile strengths, particularly at high temperatures. This trend carries over into polymers produced in other polymerization systems such as solution, mass and suspension polymerization, and appears to be due to the inherent polymerization habit of dichlorobutadiene.

Example X

| Water | 4400 grams |
|---|---|
| Dichlorobutadiene | 1885 grams (15.45 moles) |
| Thiophenol | 1.55 grams (.0141 mole) plus increments per Table VIII |
| Alkyl sodium sulfonates (as in Example I) | 18.8 grams |

For this example there was provided a 5 liter Pyrex flask provided with a rotary stirrer operating through a seal, and with connections for introducing nitrogen into the free space in the flask. The flask was immersed in a water bath arranged to maintain the contents of the flask at 5° C.

The ingredients of the recipe, together with the original charge portion of the thiophenol, were placed in the vessel and the temperature adjusted to 5° C., which temperature was maintained throughout the ensuing reaction. Nitrogen was introduced over reaction mixture to sweep out any oxygen present, which introduction was continued throughout the subsequent processing to maintain anaerobic conditions.

No substantial reaction occurred for about 50 minutes, which was taken as the induction period. At the end of this period the polymerization set in, as indicated by disappearance of foam from the reaction mass. Samples of the reaction mass were taken at half-hourly or more frequent intervals thereafter, and the amount of unpolymerized dichlorobutadiene and of unreacted thiophenol therein determined. Additions of thiophenol were made from time to time to keep the ratio of unpolymerized dichlorobutadiene to unreacted thiophenol as nearly as possible at its original value. Set forth hereinbelow in Table X is a log of the polymerization run, setting forth the reaction times from the charging of the reaction vessel to the taking of the samples, the results of the analyses on the samples, and the incremental amounts of thiophenol added to the polymerization mass after the analyses were completed (usually about 10 minutes after taking of the sample). At the end of 11 hours, the polymer latex was precipitated by addition of methanol, the precipitated resin dewatered and washed on a filter, and dried.

As distinguished from polymers prepared by processes in which all of the mercaptan modifier is added at the outset of the reaction, the polymer prepared as above described was characterized by a sharper melting range, lower solubility, higher density and insolubility in boiling carbon tetrachloride. These improved properties reflect the narrower dispersion of the molecular weight of the polymer molecules resulting from the constant ratio of free monomer to free modifier during polymerization. The resin prepared as above described was converted into filaments by the process of Example XI below. The resin had an intrinsic viscosity, determined as described in Example I, of 0.40.

Table X

| Reaction Time (from charging) | Unpolymerized Dichlorobutadiene in Batch, moles (A) | Unreacted Thiophenol in Batch, moles (B) | Ratio A/B | Thiophenol added, grams | Intrinsic Viscosity of Polymer |
|---|---|---|---|---|---|
| 0 | 15.45 | .0141 | 1,095 | | |
| 50 min | 15.45 | .0132 | 1,170 | | |
| 1 hr | 15.09 | .0123 | 1,230 | | 0.41 |
| 1 hr. 10 min | 14.90 | .0122 | 1,220 | | 0.41 |
| 1 hr. 30 min | 14.71 | .0128 | 1,150 | | 0.41 |
| 2 hrs | 14.00 | .01155 | 1,210 | | 0.40 |
| 2.5 hrs | 13.35 | .01110 | 1,200 | .130 | 0.41 |
| 3 hrs | 12.54 | .0113 | 1,110 | | 0.39 |
| 3.5 hrs | 11.50 | .0099 | 1,160 | .130 | 0.40 |
| 4.0 hrs | 10.75 | .0097 | 1,110 | | 0.40 |
| 4.5 hrs | 9.62 | .0078 | 1,230 | .130 | 0.40 |
| 5.0 hrs | 8.58 | .0072 | 1,200 | .130 | 0.40 |
| 5.5 hrs | 7.82 | .0065 | 1,200 | .120 | 0.41 |
| 6.0 hrs | 6.83 | .0064 | 940 | .100 | 0.41 |
| 6.5 hrs | 6.12 | .0066 | 910 | | 0.40 |
| 7.0 hrs | 5.36 | .0059 | 905 | | 0.40 |
| 7.5 hrs | 5.00 | .0043 | 1,170 | .100 | 0.40 |
| 8.5 hrs | 4.35 | .0040 | 1,090 | .080 | 0.40 |
| 9.5 hrs | 3.61 | .0043 | 835 | .030 | 0.40 |
| 10.5 hrs | 3.25 | .0030 | 1,090 | .100 | 0.40 |

Example XI.—Miscellaneous Processing

Dichlorobutadiene polymer (polymerized at 5° C. as described in Example X) _____ 95
2,4-diamylphenyl salicylate _____ 5

The above ingredients were ball milled together to effect thorough blending. The ingredients were then melted and extruded at the rate of 1.25 grams per minute through a die maintained at 215° C. and having an orifice diameter of .018 inch. The emerging filament was quenched in a water bath maintained at 20° C., being drawn away from the die by a pair of snubbing rolls revolving at a peripheral speed of 16 feet per minute. From the snubbing rolls, the quenched filament passed to a pair of drawing rolls having a peripheral speed of 80 feet per minute, so that the quenched filament was elongated to five times its original length. The filament was thereby converted to an oriented crystalline form exhibiting the X-ray diffraction pattern of Fig. 1. The filament had a tensile strength of 35,000 pounds per square inch, and an elongation at break of 40%. The filament had excellent flexibility and fatigue resistance.

Superstretching

The filament produced as just described was passed through a hot water bath maintained at 95° C. The filament passed over snubbing rolls at the beginning of its passage through the bath, and passed over drawing rolls at its exit from the bath, the ratio of the peripheral speeds of the snubbing rolls to that of the drawing rolls being 1.6. The filament was quickly cooled upon its emergence from the bath. The tensile strength of the filament so treated was 85,000 pounds per square inch, and the elongation thereof at break was 15%. The filament had some tendency to shrink at high temperatures, e. g., if not restrained, it would shrink 20% in boiling water. The filament exhibited the X-ray pattern of Fig. 3.

Heat Setting

The superstretched filament prepared as just described was wound on reels and fastened to prevent shrinkage thereof and then heat treated in a hot-air oven at 150° C. for thirty minutes. The tensile strength of the treated filament was 90,000 pounds per square inch. The filament shrank only 2% in length in boiling water. The dynamic modulus of the filament was $8.95 \times 10^{10}$ dynes/cm.$^2$, and the energy loss due to hysteresis is $2.62 \times 10^{10}$ ergs/cycle/c. c. Creep at 140° C. was 1% under a load of $5 \times 10^5$ grams per square centimeter. A section of filament prepared as above described and having a diameter of .011 endured over 200,000 cycles in the Massachusetts Institute of Technology Folding Endurance Tester, the load on the filament being 0.2 gram.

Example XII.—High Temperature Inhibitor Polymerization

| | Parts |
|---|---|
| Dichlorobutadiene | 100 |
| Para cresol | 1 |

The above materials were dissolved together and heated in a sealed vessel at 120° C. for 2 hours. The resultant resinous polymer had an intrinsic viscosity of 0.4 and was extruded and oriented similarly to the resins of the preceding examples to yield crystalline fibers exhibiting the several X-ray diagrams of the figures.

From the foregoing general discussion and detailed specific examples, it will be evident that this invention provides novel oriented crystalline fibers of polymers of dichlorobutadiene having excellent mechanical properties, notably tensile strength, flex life and dimensional stability. The dichlorobutadiene polymer has inherent high stability against deterioration by heat, which greatly simplifies the problems attending simple extrusion and orientation manipulations, and also renders commercially practical various high temperature processing and treatments, resulting in oriented products having extraordinary tensile strength and shrink- and creep-resistance at elevated temperatures. The products of the invention are based upon dichlorobutadiene, which may be cheaply manufactured via several synthetic procedures.

What is claimed is:
1. An oriented crystalline body of a resin se- lected from the group consisting of polymers of 2,3-dichlorobutadiene-1,3, copolymers thereof with other unsaturated compounds copolymerizable therewith containing at least 90% of 2,3-dichlorobutadiene-1,3 copolymerized therein, polymers of 2,3-dichlorobutadiene-1,3 which have been subjected to restrained chlorination confined to the introduction of from 3% to 5% of chlorine based on the weight of such polymers and copolymers of 2,3-dichlorobutadiene-1,3 with other unsaturated compounds copolymerizable therewith containing at least 90% 2,3-dichlorobutadiene-1,3 copolymerized therein which have been subjected to restrained chlorination confined to the introduction of from 3% to 5% of chlorine, based on the weight of such copolymers said resin having an intrinsic viscosity of from 0.1 to 1.5.

2. A body of a resin selected from the group consisting of polymers of 2,3-dichlorobutadiene-1,3, copolymers thereof with other compounds copolymerizable therewith containing at least 90% of 2,3-dichlorobutadiene-1,3 copolymerized therein, polymers of 2,3-dichlorobutadiene-1,3 which have been subjected to restrained chlorination confined to the introduction of from 3% to 5% of chlorine based on the weight of such polymers and copolymers of 2,3-dichlorobutadiene-1,3 with other unsaturated compounds copolymerizable therewith containing at least 90% 2,3-dichlorobutadiene-1,3 copolymerized therein which have been subjected to restrained chlorination confined to the introduction of from 3% to 5% of chlorine, based on the weight of such copolymers said body being crystalline with the crystals thereof oriented in a single direction, and said resin having an intrinsic viscosity of from 0.1 to 1.5.

3. A filament of a resin selected from the group consisting of polymers of 2,3-dichlorobutadiene-1,3, copolymers thereof with other unsaturated compounds copolymerizable therewith containing at least 90% of 2,3-dichlorobutadiene-1,3 copolymerized therein, polymers of 2,3-dichlorobutadiene-1,3 which have been subjected to restrained chlorination confined to the introduction of from 3% to 5% of chlorine based on the weight of such polymers and copolymers of 2,3-dichlorobutadiene-1,3 with other unsaturated compounds copolymerizable therewith containing at least 90% 2,3-dichlorobutadiene-1,3 copolymerized therein which have been subjected to restrained chlorination confined to the introduction of from 3% to 5% of chlorine, based on the weight of such copolymers said filament being crystalline with the crystals thereof oriented in the direction of the length of the filament and said resin having an intrinsic viscosity of from 0.1 to 1.5.

4. A film of resin selected from the group consisting of polymers of 2,3-dichlorobutadiene-1,3, copolymers thereof with other unsaturated compounds copolymerizable therewith containing at least 90% of 2,3-dichlorobutadiene-1,3 copolymerized therein, polymers of 2,3-dichlorobutadiene-1,3 which have been subjected to restrained chlorination confined to the introduction of from 3% to 5% of chlorine based on the weight of such polymers and copolymers of 2,3-dichlorobutadiene-1,3 with other unsaturated compounds copolymerizable therewith containing at least 90% 2,3-dichlorobutadiene-1,3 copolymerized therein which have been subjected to restrained chlorination confined to the introduction of from 3% to 5% of chlorine, based on the weight of such copolymers said film being crystalline with the crystals thereof oriented parallel to the surface of said film and said resin having an intrinsic viscosity of from 0.1 to 1.5.

5. An oriented-crystalline body of a polymer of 2,3-dichlorobutadiene-1,3 which polymer has been subjected to restrained chlorination confined to the introduction of from 3% to 5% of chlorine, based on the weight of said polymer, and which polymer further has an intrinsic viscosity of from 0.1 to 1.5.

6. A filament of a polymer of 2,3-dichlorobutadiene-1,3, said filament being crystalline with the crystals thereof oriented in the direction of said filament, said polymer having been subjected to restrained chlorination confined to the introduction of from 3% to 5% of chlorine, based on the weight of said polymer, and said polymer further having an intrinsic viscosity of from 0.1 to 1.5.

7. A filament of a polymer of 2,3-dichlorobutadiene-1,3, said polymer having been subjected to restrained chlorination confined to the introduction of from 3% to 5% of chlorine, based on the weight of said polymer, and said polymer further having an intrinsic viscosity of from 0.1 to 1.5, said filament being crystalline with the crystals thereof oriented in the direction of the filament, and said filament further, when exposed to copper X-radiation induced by a 20,000-volt electron beam, projecting upon a planar surface disposed at a distance of 5 centimeters from the body and normal to the beam of X-rays, an X-ray pattern comprising at least two equatorial spots, one 1.67 centimeters and the other 2.2 centimeters from the center of the pattern.

8. A body of a resin selected from the group consisting of polymers of 2,3-dichlorobutadiene-1,3, copolymers thereof with other unsaturated compounds copolymerizable therewith containing at least 90% of 2,3-dichlorobutadiene-1,3 copolymerized therein, said resin having an intrinsic viscosity of from 0.1 to 1.5, and said body being crystalline with the crystals thereof oriented in one direction, and said body further, when exposed to copper X-radiation induced by a 20,000-volt electron beam, projecting upon a planar surface disposed at a distance of 5 centimeters from the body and normal to the beam of X-rays, an X-ray pattern comprising at least two equatorial spots, one 1.65 centimeters and the other 2.2 centimeters from the center of the pattern.

9. An oriented crystalline body of a polymer of 2,3-dichlorobutadiene-1,3, said polymer having an intrinsic viscosity of 0.1 to 1.5.

10. A body of a polymer of 2,3-dichlorobutadiene-1,3 having an intrinsic viscosity of from 0.1 to 1.5, said body being crystalline with the crystals thereof oriented in one direction, and said body further, when exposed to copper X-radiation induced by a 20,000-volt electron beam, projecting upon a planar surface at a distance of 5 centimeters from the body and normal to the beam of X-rays, an X-ray pattern comprising at least two equatorial spots, one 1.65 centimeters and the other 2.2 centimeters from the center of the diagram.

11. A filament of a resin selected from the group consisting of polymers of 2,3-dichlorobutadiene-1,3, copolymers thereof with other unsaturated compounds copolymerizable therewith containing at least 90% of 2,3-dichlorobutadiene-1,3 copolymerized therein, polymers of 2,3-dichlorobutadiene-1,3 which have been subjected to restrained chlorination confined to the introduction of from 3% to 5% of chlorine based on the weight of such polymers and copolymers of 2,3-dichlorobutadiene-1,3 with other unsaturated compounds copolymerizable therewith containing at least 90% of 2,3-dichlorobutadiene-1,3 copolymerized therein which have been subjected to restrained chlorination confined to the introduction of from 3% to 5% of chlorine, based on the weight of such copolymers, said resin having an intrinsic viscosity of from 0.1 to 1.5, and said filament being crystalline with the crystals thereof oriented in the direction of said filament, and said filament further, when exposed to copper X-radiation induced by a 20,000-volt electron beam, projecting upon a planar surface disposed at a distance of 5 centimeters from the filament and normal to the beam of X-rays, an X-ray pattern comprising at least two equatorial spots, one 1.65 centimeters, and the other 2.2 centimeters from the center of the pattern.

12. A filament of a polymer of 2,3-dichlorobutadiene-1,3 having an intrinsic viscosity of from 0.1 to 1.5, said filament being crystalline with the crystals thereof oriented in the direction of the filament, and said filament further, when exposed to copper X-radiation induced by a 20,000-volt electron beam, projection upon a planar surface at a distance of 5 centimeters from the body and normal to the beam of X-rays, an X-ray pattern comprising at least two equatorial spots, one 1.65 centimeters and the other 2.2 centimeters from the center of the diagram.

LEROY B. KUHN.

REFERENCES CITED

The following references are of record in the file of this patent:

UNITED STATES PATENTS

| Number    | Name            | Date          |
|-----------|-----------------|---------------|
| 1,965,369 | Carothers et al.| July 3, 1934  |
| 2,198,927 | Waterman et al. | Apr. 30, 1940 |
| 2,288,982 | Waterman et al. | July 7, 1942  |
| 2,344,511 | Harder          | Mar. 21, 1944 |

OTHER REFERENCES

Fielding, Ind. & Eng. Chem., vol. 35, No. 12, Dec. 1943, pp. 1259–61.